Patented Jan. 29, 1952

2,583,925

UNITED STATES PATENT OFFICE 2,583,925

METALLIZED ORTHO-HYDROXY, ORTHO AMINO MONOAZO DYESTUFFS

Heinrich H. Bestehorn, Easton, Pa., and Jack F. Morgan, Phillipsburg, N. J., assignors to General Aniline & Film Corporation, New York, N. Y., a corporation of Delaware No Drawing. Application December 3, 1947, Serial No. 789,556

3 Claims. (Cl. 260—149)

This invention relates to new metallized ortho-hydroxy, ortho-amino monoazo dyestuffs, which dyestuffs are capable of dyeing nylon (linear polyamide) in deep shades.

Apart from the qualities of the dyeing, it is known that nylon may be dyed with most dyestuffs which dye wool. Among such, the metallized, water-soluble, acid, monoazo dyestuffs have been recommended for the purpose. However, as it is also known, these dyestuffs have certain drawbacks for the dyeing of nylon, the dyeing being not as deep as might be desired and of limited fastness to light and washing.

We have now found a group of new metallized ortho-hydroxy, ortho-amino monoazo compounds which are outstanding in their properties as dyestuffs for nylon. The new compounds are free from sulfonic acid groups and are further characterized by containing a single carboxy group, which group is located in the diazo component of the dyestuff and in non-ortho position to the azo bridge, i. e. in non-chelating position. The new compounds have the general formula:

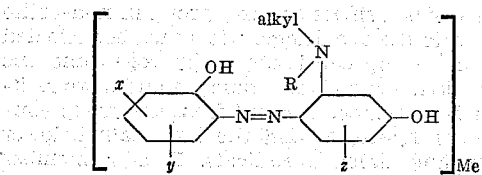

wherein $x$ is a carboxy group in non-ortho position to the azo bridge, $y$ is hydrogen or an alkyl, alkoxy, halogen or nitro radical, $z$ is hydrogen or an alkyl, alkoxy or halogen radical, R is hydrogen or an alkyl radical, and Me is a metal in complex combination with the azo bridge, which metal may be chromium, copper, cobalt or nickel.

The new dyestuffs are capable of dyeing nylon in deep shades of excellent fastness to light and washing, the carboxy group promoting affinity of the dyestuffs for nylon. They are not as soluble in water as the known metallized acid monoazo dyestuffs carrying a sulfonic acid group, yet their solubility is sufficient such that no dispersion is necessary for their application to the fiber. At higher temperatures their solubility is greatly increased.

In contradistinction to the aforementioned metallized acid monoazo dyestuffs carrying a sulfonic acid group, the new dyestuffs have excellent build-up properties for nylon and are generally superior thereto in the wash-fastness of the nylon dyeings. The new dyestuffs are in the same respects superior to the unsulfonated metallized monoazo dyestuffs which, in the one instance, contain a chelated carboxy group and, in the other, a plurality of carboxy groups but none in chelation. They are further distinguished from the aforementioned dyestuffs containing a chelated carboxy group in possessing better stability in acid bath and better exhaust. They are, moreover, similar enough in their dyeing properties to the dyestuffs now used in the trade to allow dyeings to be made on nylon with a mixture of the old with the new dyestuffs.

The new compounds may be prepared in the way known for the manufacture of metallized ortho-hydroxy, ortho-amino monoazo dyestuffs, the coupling being done in alkaline medium. The diazo component is derived from an unsulfonated hydroxy-amino benzoic acid wherein the hydroxy and amino groups are in ortho position to each other and the single carboxy group is in non-ortho position to the amino group, the nucleus of the hydroxy-amino benzoic acids being otherwise unsubstituted, or substituted by an alkyl, alkoxy, halogen or nitro group, for example, 3-amino salicylic acid, 3-hydroxy-4-aminobenzoic acid, 4-hydroxy-3-amino benzoic acid, 5-chloro-3-amino salicyclic acid, 4-amino-3-hydroxy-2-methyl benzoic acid, 5-nitro-3-amino salicylic acid, 5-amino-4-hydroxy - 3 - methoxy benzoic acid, and the like. The diazo component is coupled in alkaline medium with an unsulfonated N-alkyl- or N-dialkyl-metaaminophenol compound of the general formula:

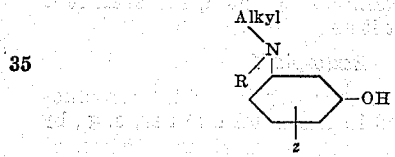

wherein $z$ and R have the significance aforesaid. The resulting ortho-hydroxy, ortho-amino monoazo dyestuff is then metallized.

Coupling compounds for the new dyestuffs are in part known in the literature and can be prepared using the general methods described in German Patents 49,060, 44,792, 44,002, 76,419, 48,151 and 82,765.

Suitable N-alkylamino and N-dialkylaminophenols, unsubstituted in the nucleus, are for example, m - methylaminophenol, m - dimethylaminophenol, m-ethylaminophenol, m-diethylaminophenol, and the like.

Meta-aminophenols substituted in the nucleus by an alkyl, alkoxy or halogen group, which can be employed as coupling compounds for the new dyestuffs are, for example, 3-methylamino-o-cresol, 5-diethylamino-o-cresol, 3-methylaminoguaicol, 5-dimethylaminoguaicol, 2-chloro-3-ethylaminophenol, 5-dimethylamino-3-hydroxyanisole, 5-methylamino-3-hydroxyphenetole, 5-dimethylamino-m-cresol, 5-dimethylamino-3-hydroxy-o-xylene, 5-chloro-3-diethylaminophenol and the like. Obviously, other known methods can be employed for preparing alkyl, alkoxy or halogen substituted m-aminophenols suitable for use as starting materials for coupling compounds.

Metallization of the ortho-hydroxy, ortho-amino monoazo dyestuffs can be carried out by any of the methods known in the art. Depending upon the metal employed and the constitution of the dyestuff, it may be accomplished in alkaline, neutral or acid medium. While we prefer to carry out the metallization in an aqueous medium, it can also be effected in an organic solvent, as for example, alcohol, or in mixtures of such solvents with one another or with water.

The dyeing of nylon with the new compounds can be carried out in a neutral or preferably a slightly acid bath. The dyeing can be carried out at temperatures in the dyebath of about 190° F. to the boiling point. For acidification of the dyebath there can be used, acetic, formic and the like acids. Advantageously, substances which in aqueous solution dissociate on heating to liberate free acid, e. g., ammonium thiocyanate, diethyl tartrate and the like, can also be employed for the acidification of the dyebath. A specific illustration of the mode of dyeing nylon with the new dyestuffs is as follows. A solution of one of the new dyestuffs is prepared by heating to the boiling point 0.15 part of the dyestuff with 300 parts of water containing a suitable surface active agent, e. g., approximately 0.1% of the oleic acid amide of methyl taurine, sodium salt. Five parts of nylon are entered into the hot dyebath and heating continued. After 15 minutes, 5 parts of 1% acetic acid solution is added and a like amount after another 15 minutes, the bath being slightly acid after these additions. After about 1 hour total heating time the nylon is removed from the dyebath, rinsed in warm water, and soaped by immersing it in a hot solution of 5 parts of a 10% green soap solution in 300 parts of water. The dyed nylon is again rinsed and then dried and conditioned in the usual manner.

The invention is further illustrated by the following specific examples to which, however, it is not intended that it be limited.

*Example 1*

19 grams of 3-aminosalicyclic acid, hydrochloride are diazotized in the usual manner, e. g., by dissolving it in 300 ml. of water and 15 ml. of conc. hydrochloric acid, cooling and adding 6.9 grams of sodium nitrite as 30% solution. The diazo suspension is then poured into a solution of 17 grams of m-diethylaminophenol dissolved in 800 ml. of water, 5 grams of sodium hydroxide as 40% solution and 25 grams of sodium carbonate as 20% solution. After stirring for 2 hours, the excess soda is neutralized with dilute acetic acid. 150-200 ml. of conc. ammonium hydroxide is added and after stirring a few minutes, the mixture is treated with 24 grams of cobaltous chloride (6H₂O) dissolved in 200 ml. of water. After stirring for 4 hours at 50-60° C., the cobalt dye is filtered off. It is converted to its sodium salt by treatment with an aqueous solution of the equivalent quantity of sodium hydroxide, dried, and ground to a fine powder. It has the probable formula:

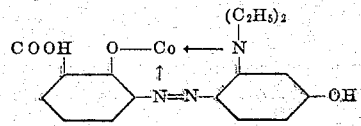

and dyes nylon from acid bath an orange-red shade.

*Example 2*

When in the above example, 22.6 grams of 5-chloro-3-aminosalicyclic acid hydrochloride is used in place of the 3-aminosalicyclic acid hydrochloride as starting material for the diazo component, a cobalt dyestuff of the probable formula is obtained

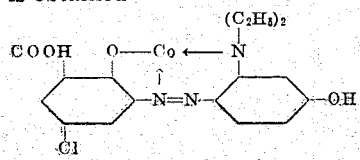

which dyes nylon from acid bath an attractive bluish-red shade.

By replacing the cobaltous chloride in the above examples by copper sulfate or nickelous sulfate respectively, the corresponding copper and nickel dyestuffs are obtained, dyeing nylon in various shades. The chromium metal complex may be obtained by resludging the dye paste in 700 ml. water with chromium formate and heating in a pressure vessel at 135° C. for 4 hours.

We claim:

1. A metallized ortho-hydroxy, ortho-amino monoazo dyestuff of the general formula:

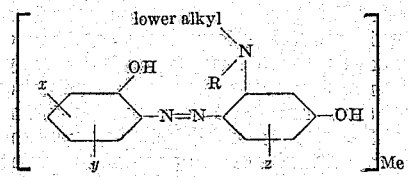

wherein $x$ is a single carboxy group in non-ortho position to the azo bridge, $y$ is a member selected from the group consisting of hydrogen and the lower alkyl, lower alkoxy, halogen and nitro radicals, $z$ is a member selected from the group consisting of hydrogen and the lower alkyl, lower alkoxy and halogen radicals, R is a member selected from the group consisting of hydrogen and a lower alkyl radical, and Me is a metal in complex combination with the azo bridge selected from the group consisting of chromium, copper, cobalt and nickel.

2. The metallized ortho-hydroxy, ortho amino monoazo dyestuff of the formula:

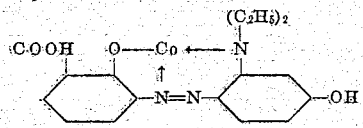

3. The metallized ortho-hydroxy, ortho-amino monoazo dyestuff of the formula:

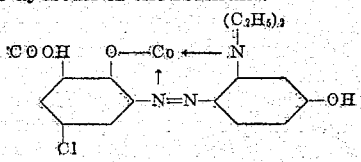

HEINRICH H. BESTEHORN.
JACK F. MORGAN.

(References on following page)

REFERENCES CITED

The following references are of record in the file of this patent:

UNITED STATES PATENTS

| Number | Name | Date |
|---|---|---|
| 2,117,731 | Kollmann et al. | May 17, 1938 |
| 2,277,551 | Kirst | Mar. 24, 1942 |

FOREIGN PATENTS

| Number | Country | Date |
|---|---|---|
| 77,077 | Switzerland | Mar. 16, 1918 |

OTHER REFERENCES

Textile Colorist, December 1943, pages 551 and 552.

In re Prutton, 1914 C. D. 727, 533, O. G. 755.